United States Patent
Stark et al.

(10) Patent No.: US 10,628,784 B2
(45) Date of Patent: *Apr. 21, 2020

(54) METHOD FOR DROPPING OFF A SHIPMENT IN A MOTOR VEHICLE, AND ASSOCIATED MOTOR VEHICLE

(71) Applicant: Audi AG, Ingolstadt (DE)

(72) Inventors: Christiane Stark, Ingolstadt (DE);
Andre Hainzlmaier, Geisenfeld (DE);
Martin Enning, Ingolstadt (DE);
Michael Schweitzer, Wolnzach (DE)

(73) Assignee: Audi AG, Ingolstadt (DE)

( * ) Notice: Subject to any disclaimer, the term of this patent is extended or adjusted under 35 U.S.C. 154(b) by 380 days.

This patent is subject to a terminal disclaimer.

(21) Appl. No.: 15/428,760

(22) Filed: Feb. 9, 2017

(65) Prior Publication Data

US 2017/0154303 A1    Jun. 1, 2017

Related U.S. Application Data

(63) Continuation of application No. 15/123,848, filed as application No. PCT/EP2015/000541 on Mar. 11, 2015, now Pat. No. 10,460,282.

(30) Foreign Application Priority Data

Mar. 31, 2014    (DE) .......... 10 2014 004 673

(51) Int. Cl.
*G06Q 10/08*    (2012.01)
*G07C 9/00*    (2020.01)
(Continued)

(52) U.S. Cl.
CPC ......... *G06Q 10/0833* (2013.01); *B60R 25/24* (2013.01); *G06K 7/10297* (2013.01);
(Continued)

(58) Field of Classification Search
CPC .. G06Q 10/0833; G06Q 10/083; G06Q 50/28; G06Q 10/0832; G06Q 10/08; G06Q 10/08355; G06Q 10/0835
See application file for complete search history.

(56) References Cited

U.S. PATENT DOCUMENTS 8,870,067 B2    10/2014    Schroeter et al.
2003/0079129 A1    4/2003    Lindsay
(Continued)

FOREIGN PATENT DOCUMENTS

CN    201352363 Y    11/2009
CN    102265311 A    11/2011
(Continued)

OTHER PUBLICATIONS

Prynne, M. (Feb. 21, 2014). Car that collects shopping while you work. The Daily Telegraph Retrieved from http://dialog.proquest.com/professional/docview/1500615918?accountid=131444 (Year: 2014).*

(Continued)

*Primary Examiner* — Michael P Harrington
(74) *Attorney, Agent, or Firm* — Sterne, Kessler, Goldstein & Fox, P.L.L.C.

(57) ABSTRACT

The present disclose is directed to a method for dropping off a shipment in a motor vehicle. In one embodiment, the method comprises: transmission of a digital key to a control device of the motor vehicle, transmission of a piece of authentication information to an authentication element, capture of the piece of authentication information or of a piece of information derived from the piece of authentication information, actuation of a vehicle device to allow access to at least part of the motor vehicle interior by the control device when an authentication condition that evaluates both the piece of authentication information or the derived piece of information and the digital key is met, and (Continued)

actuation of the vehicle device and/or of a further vehicle device to close the motor vehicle following storage of the shipment in the motor vehicle or after a prescribed waiting time.

15 Claims, 2 Drawing Sheets

(51) Int. Cl.

| | | |
|---|---|---|
| *B60R 25/24* | (2013.01) | |
| *G06K 7/10* | (2006.01) | |
| *G06K 19/06* | (2006.01) | |
| *G06K 19/07* | (2006.01) | |
| *B60R 25/00* | (2013.01) | |

(52) U.S. Cl.
CPC . *G06K 19/06018* (2013.01); *G06K 19/06037* (2013.01); *G06K 19/0723* (2013.01); *G07C 9/00896* (2013.01); *B60R 25/00* (2013.01); *B60R 2325/105* (2013.01); *B60R 2325/20* (2013.01); *G07C 2009/0092* (2013.01)

(56) References Cited

U.S. PATENT DOCUMENTS

| | | |
|---|---|---|
| 2012/0188054 A1 | 7/2012 | Bongard |
| 2014/0180959 A1 | 6/2014 | Gillen et al. |
| 2015/0106296 A1 | 4/2015 | Robinson et al. |
| 2015/0215779 A1 | 7/2015 | Fokkelman et al. |
| 2017/0017920 A1 | 1/2017 | Stark et al. |

FOREIGN PATENT DOCUMENTS

| | | |
|---|---|---|
| CN | 102376042 A | 3/2012 |
| CN | 103544591 A | 1/2014 |
| CN | 103999497 A | 8/2014 |
| DE | 19953622 A1 | 5/2001 |
| DE | 102011018901 A1 | 10/2011 |
| DE | 102011089496 A1 | 6/2013 |
| EP | 2397051 A1 | 12/2011 |
| JP | 2006206225 A | 8/2006 |

OTHER PUBLICATIONS

International Search Report and Written Opinion directed to related International Patent Application No. PCT/EP2015/000541, dated Jun. 9, 2015, with attached English-language translation; 22 pages.
International Preliminary Report on Patentability directed to related International Patent Application No. PCT/EP2015/000541, dated Jun. 22, 2016, with attached English-language translation; 12 pages.
English-language Abstract of German Patent Application Publication No. 19953622 A1, published May 10, 2001; 2 pages.
English-language Abstract of German Patent Application Publication No. 102011018901 A1, published Oct. 27, 2011; 1 page.
English-language Abstract of European Patent Application Publication No. 2397051 A1, published Dec. 21, 2011; 1 page.
English-language Abstract of Japanese Patent Application Publication No. 2006206225 A, published Aug. 10, 2006; 1 page.
"Cardrops, your car becomes an e-commerce delivery point," cardrops, accessible at http://www.cardops.com, last accessed Feb. 10, 2014; 4 pages.
"Volvo Cars demonstrates the potential of connected cars with deliveries direct to people's cars," Volvo Car Group press release, Feb. 20, 2014; 2 pages.
English-language abstract of Chinese Patent Publication No. 201352363 Y; 1 page.
English-language abstract of Chinese Patent Application Publication No. 103999497 A; 2 pages.

* cited by examiner

METHOD FOR DROPPING OFF A SHIPMENT IN A MOTOR VEHICLE, AND ASSOCIATED MOTOR VEHICLE

CROSS REFERENCE TO RELATED APPLICATIONS

This application is a continuation of U.S. patent application Ser. No. 15/123,848, filed on Sep. 6, 2016, which is the U.S. National Stage of International Application No. PCT/EP2015/000541, filed Mar. 11, 2015, which claims priority to German Patent Application No. 10 2014 004 673.7, filed Mar. 31, 2014, all of which are incorporated herein by reference in their entireties.

TECHNICAL FIELD

The invention concerns a method for dropping off of a shipment in a motor vehicle, as well as a motor vehicle.

BACKGROUND

Purchases through online commercial platforms are steadily increasing worldwide. The customers of such platforms experience it as a disadvantage that delivery services often make deliveries at times when the customer is not at home. Therefore, it is frequently necessary for customers to have their parcels delivered to package stations or branches of a delivery service, or have the parcels delivered to friends or neighbors. On the one hand, this causes substantial increased expense for the customers, and on the other hand the undeliverable or not directly deliverable parcels cause additional costs to delivery services.

The Internet site www.cardrops.com proposes delivering goods to a motor vehicle. For this, the trunk of the motor vehicle can be opened by remote control.

Publication DE 10 2011 018 901 A1 discloses a method for activating a motor vehicle closure system by a service provider or a service recipient. After a requesting of a service, at least one pass code is relayed for the activation of the motor vehicle closure system by the motor vehicle owner to the service recipient or the service provider, who is not the motor vehicle owner. In addition, the position of the motor vehicle is relayed. The person who is not the motor vehicle owner is authenticated by the pass code, after which the motor vehicle closure system is activated. The motor vehicle can be used as a personalized storage space with personal delivery.

Document JP 2006 206225 A concerns a method for receiving of shipments by means of a vehicle. The information required for the reception, namely a parking position as well as an identification information, is recorded prior to the shipping on an information server. In the course of the delivery, an authentication is done to a device at the vehicle side by means of a device of the delivery vehicle, after which a locking of a trunk space is released.

Another system for the relaying of shipments to vehicles is known from document DE 10 2011 089 496 A1. An authorization to open at least one door and/or a trunk space of the vehicle is relayed to a communication transmitter device of the delivery agent. By relaying a radio signal, containing the authorization, to the vehicle, the opening of at least one door and/or one trunk space is done.

Document DE 199 53 622 A1 discloses a method for operating a goods shipping system with a plurality of goods containers. The goods container each comprise a closure device, a storage device, a reading device and a comparison device. An access code is stored in the storage device. For access to the goods containers, delivery codes can be read from a data medium. These are compared against the access codes, and if they match there occurs an unlatching of the closure device of the goods container.

BRIEF DESCRIPTION OF THE DRAWINGS/FIGURES

DETAILED DESCRIPTION

Figure 1:
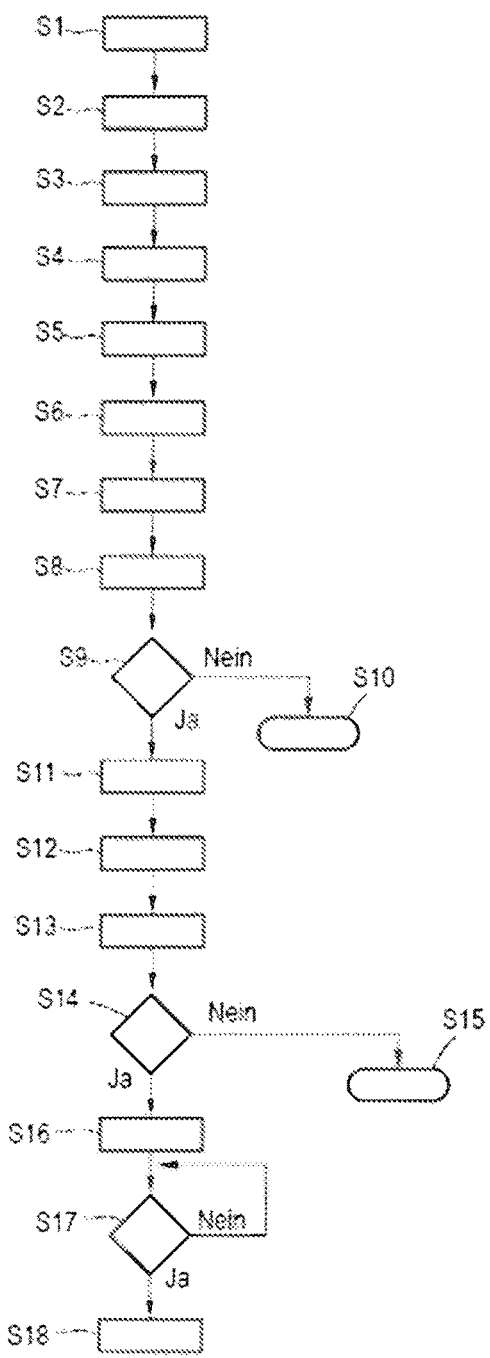
FIG. 1 illustrates a flow chart of a sample embodiment of the method according to the invention.

Thus, the problem which the invention proposes to solve is to indicate an improved method of delivering shipments to a customer, wherein a high security and a high comfort should be achieved.

The problem is solved according to the invention by a method of the kind mentioned above, which has the following steps:

generating of a temporary digital key, which allows access to the motor vehicle once or repeatedly during a given interval of time, by a central device, transmittal of the digital key via a communication device of the motor vehicle to a control device of the motor vehicle and storing of the key in the control device, transfer of a piece of authentication information associated with the shipment, which corresponds to the digital key or to a piece of information associated with the digital key, onto an authentication element, transporting of the shipment to the motor vehicle, detection of the authentication information or a piece of information derived from the authentication information by a reader of the motor vehicle, actuation of a vehicle device to enable access to at least part of the interior of the motor vehicle by the control device upon fulfillment of an authentication condition evaluating both the authentication information or the derived information and the digital key, and actuation of the vehicle device and/or another vehicle device to close the motor vehicle after the placement of the shipment in the motor vehicle or after a predetermined waiting period.

According to the invention, it is proposed to place a shipment in the motor vehicle of an addressee. In order to ensure a high degree of security in this process, the access to the motor vehicle is made possible by a digital key, which is only valid for a predetermined interval of time, especially a predetermined delivery time. The key itself can comprise the interval of time. For this, the interval of time can explicitly constitute part of the key. But it is also possible for an implicit time coding of the key to be done, for example, when certain groups of keys have a validity date intrinsic to the method. Alternatively or additionally, the predetermined time interval can be transmitted to the control device of the motor vehicle in addition to the digital key, or the control device of the motor vehicle upon receiving the key can set a predetermined time interval as of the time of reception. For example, the time interval in the method according to the invention can be 48 hours.

In particular, it is possible for the control device of the motor vehicle to mark or erase the digital key after a onetime use, in order to prevent a repeated use of this digital key.

When the method according to the invention is used in the context of an ordering process or another parcel shipment, it is possible in particular to assign a vehicle user or a motor vehicle a distinct vehicle identifier. If such a vehicle identifier is indicated as the delivery address when placing an order or for another shipment, a delivery of the shipment to the motor vehicle will occur, especially in automatic manner, with no further involvement of the person placing the order or the dispatcher. For this, it is possible in particular to place a profile of the vehicle user or the motor vehicle on the central device. This profile can contain, in addition to a distinct identification of the motor vehicle, contact data of the customer, in particular. In this case, when the shipment has been successfully dropped off, a message can be sent automatically to the customer, for example through a SMS, an email, or an application, especially of a mobile communication device.

In addition, such a profile can advantageously store alternative delivery options. Such an alternative delivery option can be used, in particular, when a locating of the motor vehicle before or during the transport of the shipment to the motor vehicle is not possible. Alternative delivery options can also be used when the motor vehicle before or during the transport of the shipment to the motor vehicle is parked in an area where it is not accessible to the delivery person. Alternative delivery options, or fallback arrangements for the method according to the invention, can be a delivery of the shipment to the residence of the vehicle user, to a given package station, to a branch office of a delivery service and/or to a neighbor. Priorities for particular delivery options can also be indicated in a corresponding profile.

In addition or alternatively to the mentioned possibilities, the method according to the invention can provide for the dropping off of the shipment in another motor vehicle, whose vehicle identifier is stored in particular in the profile on the central device. For this, it can be provided that a vehicle user of the corresponding motor vehicle must consent to such a drop-off, which is possible for example by making an entry in a profile associated with the other motor vehicle on the central device or by a request through any given means of communication, such as SMS or email.

To delivery services it is important to prove that a shipment was also in fact delivered or dropped off at a particular location. It is therefore possible for the control device, after the drop-off, i.e., in particular when closing, the motor vehicle, to additionally confirm the drop-off of the shipment. Such a continuation is possible in particular by sending a message to the central device. Alternatively, a confirmation can also be transmitted to a device associated with a delivery agent or be prepared in paper form, for example. It is additionally possible to detect the drop-off of the shipment directly by motor vehicle sensors, such as weight sensors or a camera.

The authentication element, used can be an optical encoding of the authentication information placed on the shipment, wherein the authentication information is optically detected by the reader. The reader can be, in particular, a camera of the motor vehicle, such as a backup camera. In particular, as the authentication element, the digital key can be placed on the shipment as a one-dimensional or two-dimensional pattern with two tone values in particular. Such a placement is possible in particular as a barcode or two-dimensional code, such as a QR Code®. An optical encoding on the shipment makes possible, on the one hand, an especially easy identification of the shipment, since such an optical encoding can be placed on the shipment as part of a label. On the other hand, typically several cameras are already present in motor vehicles, which can serve in this case as an optical reader. The method according to the invention can thus be implemented with minimal technical expense.

Alternatively, it is possible to use as the authentication element a transponder device associated with the shipment, wherein the authentication information or the derived information is detected by a communication of the reader with the transponder device. The transponder device in particular can be arranged on the shipment. For example, the transponder device can be integrated in a label of the shipment or in a packaging of the shipment. In particular, a RFID chip or a NFC chip can be used as the transponder device. RFID (radio-frequency identification) describes a method in which small MD chips, which are transponders, are used to transmit identification information wirelessly. Such a transmission is possible over a range of a few tens of centimeters, up to a few meters. Alternatively to this, near field communication (NFC) can be used to transmit identification information. The essential difference between the use of a RFID chip and the use of a NFC chip is the possible transmission range, which in the case of a NFC chip is limited to a few centimeters.

Advantageously when using transponder devices as the authentication element the communication between reader and transponder device can be cryptographically secured, which avoids in particular a clear text transmission of the digital key. Furthermore, when using corresponding RFID or NFC chips, it can be prevented that a third party can read the digital key without additional information and thus gain access to the motor vehicle. Methods for a cryptographically secured communication between RFID or NFC chips and readers, such as challenge-response methods, are known in the prior art and shall therefore not be discussed more closely here.

As a further alternative, the authentication element can be a separate electric device, by which several pieces of information coordinated with different shipments are stored. Such an electric device can be, in particular, a mobile communication device, such as a smartphone. When using a separate electric device, a delivery person can manage pieces of authentication information about a plurality of different shipments being delivered in a single device. Furthermore, the device can provide additional information, such as location functions for the motor vehicle or functions for detecting of a delivery confirmation provided by the control device. The authentication information can be represented by the electric device, for example optically, through a display, after which it can be detected, for example, by a camera of the motor vehicle. Alternatively, the electric device can communicate directly with the reader via a radio link.

It is possible for the motor vehicle to comprise a position detection device, whereby the position data of the motor vehicle is detected constantly or upon fulfillment of a predetermined transmittal condition by the position detection device and transmitted to the central device, after which the central device stores a time-dependent profile of the position data, after which the central device determines, when a shipment is present for delivery, the probable whereabouts of the motor vehicle at the delivery time and provides this to the delivery agent. A corresponding time-dependent profile of the position data can describe in particular prospective positions of the motor vehicle on different days, wherein a distinction is drawn in particular between week days and the weekend, and the probable position can be dependent in particular on the time of day. As the position data in this case the exact positions of the motor vehicle can be stored, but it is also possible to determine only a street, a parking place, a parking structure or the like as the position data.

The position detection device can be in particular a satellite navigation system.

In addition, local radio networks, an optical detection of particular markings, an evaluation of odometer data or acceleration sensors or the like can be used for this. Such supplements to the satellite navigation data are especially advantageous when a position of the motor vehicle needs to be determined exactly in a parking structure or in other enclosed areas.

Alternatively or additionally, the time-dependent profile can be given or clarified by the vehicle user himself. Thus, for example, it is possible to indicate a fixed parking place number when a motor vehicle is parked regularly in a parking structure.

As a further alternative, the vehicle user can also provide specific position data and time windows for the motor vehicle for a shipment.

The providing of the probable whereabouts can be done in particular before the start of the transport of the shipment to the motor vehicle. When delivering a plurality of shipments to different locations, it is often desirable to establish a delivery route already with a substantial length of time prior to the start of the actual transport of the shipments. Thanks to the presence of a time dependent profile of the position data, such a route planning or optimization prior to the transport can also be done for a delivery of a shipment to a mobile location, namely, a motor vehicle.

In addition, it is possible for the central device, prior to or during the transport of the shipment to the motor vehicle, to poll the current position data of the motor vehicle and transmit this to another communication device. The other communication device is associated in particular with a delivery agent. A corresponding polling of the current position data can be done in particular when a corresponding request is made by the delivery agent, especially through the other communication device. The delivery agent can therefore ask, at any given time on his delivery route, whether the motor vehicle is present at the predicted position or at another position. If, during such a request, no current position can be detected or if the current position data of the motor vehicle show a whereabouts in a not publicly accessible area, the transport of the shipment to the motor vehicle can be broken off. Alternatively or additionally, a transport of the shipment to a different specified location can occur. Options for this, such as the delivery to a residential address or to another vehicle trunk, have already been described above.

In particular, when a motor vehicle is present in a parking structure or in other areas where satellite navigation information is disrupted, a position of the motor vehicle can often be determined only with a precision to within several meters. In order to still make possible a locating of the motor vehicle in which the shipment is supposed to be dropped off, further information about the motor vehicle can be provided to the delivery agent, especially through a communication device associated with him, such as an identifier, a color, or a vehicle type.

In order to facilitate the identification of the correct motor vehicle, it is possible for the motor vehicle to give a sign to the delivery agent. In particular, the central device can transmit via the communication device of the motor vehicle a request for a sign to the control device, after which this actuates a delivery indicator device to give a sign to the delivery agent. This is possible in particular when the delivery agent makes a corresponding request to the central device, for example through a communication device associated with him. In particular, it is possible for the communication device associated with the delivery agent to enter the authentication information of the shipment or the information derived from this. In this way, on the one hand, a matching of the request with the correct motor vehicle is accomplished, and on the other hand the detecting of the corresponding information serves to authenticate the delivery agent.

The delivery indicator device used can be in particular a horn of the motor vehicle, a lighting device, especially a blinker, an alarm system, or the like. Motor vehicles are provided with a plurality of optical and/or acoustical indicator means which can also be used as a delivery indicator device.

In the method according to the invention it is advantageous to prevent the motor vehicle from being moved shortly before the delivery agent arrives at the motor vehicle, which would at least temporarily prevent a drop off of the shipment in the motor vehicle. Therefore, upon fulfillment of a usage condition, which indicates an intention of the driver to move the motor vehicle within a given further interval of time and/or after a message from the central device, a driver indicator device is actuated by the control device to give a sign to the driver. In particular, a time interval around a delivery time transmitted by the central device can be determined as a further time interval in this way. The message from the central device can be, in particular, an already explained requesting of the current position by the central device, since this is typically sent out relatively shortly before the delivery agent reaches the motor vehicle. It is also possible for such a message from the central device to be triggered by a request of the delivery agent through a communication device associated with the delivery agent. As the sign to the driver, it is possible to use for example an indication on a display. For example, the message can be indicated: "Delivery expected in five minutes. Please wait". The condition of use can be fulfilled, in particular, when the motor vehicle is unlocked, the ignition turned on, a gear engaged, or the like.

The providing of access to at least one part of the vehicle interior can be done in various ways according to the invention. In particular, the access to the vehicle interior can be made possible by opening a window or unlatching a lock of the motor vehicle. The unlatched lock can be, for example, the lock for the trunk of the motor vehicle. If the access is made possible by opening a window, the window can be in particular a window in the rear seat bank area of the motor vehicle and/or a window on the side away from the driver.

In order to gain greater acceptance of the method of the invention with vehicle users, it is advantageous for the delivery process to be documented for the motor vehicle owner. This is possible in particular when a camera of the motor vehicle detects the part of the vehicle interior that was made accessible, with the control device saving several snapshots of the camera between the providing of access and the closing of the motor vehicle. In particular, the camera can record a film for the period during which the motor vehicle is opened.

In addition, the invention concerns a motor vehicle, comprising a control device, a reader and a communication device, wherein the control device serves to store a digital key transmitted from a central device via the communication device, to detect authentication information associated with the shipment or an information derived from the authentication information by means of the reader, to actuate a vehicle device to enable access to at least one part of the motor vehicle interior upon fulfillment of an authentication condition evaluating both the authentication information or the derived information and the digital key, and to actuate the vehicle device and/or another vehicle device for the closing of the motor vehicle after drop-off of the shipment in the motor vehicle or after a predetermined waiting time. The motor vehicle according to the invention is suitable in particular to take part in the method according to the invention.

The motor vehicle according to the invention can comprise, in particular, a separately closable receiving device for the receiving of the shipment, which is accessible to the delivery agent upon fulfillment of the authentication condition. This can be detachably connected to the motor vehicle, in particular. The detachable connection can be done, for example, by an Isofix connection on a rear seat, such as is known for the fastening of child seats. The receiving device in particular can be arranged on a rear seat or on the passenger's seat. Alternatively, the receiving device can be arranged in the trunk space of the motor vehicle.

It is especially advantageous for the receiving device to be compact and stowable when not in use. Therefore, the receiving device can be foldable. For example, the receiving device can be designed as a box or a netting.

The receiving device can comprise a closure mechanism, which is controllable by the control device and is actuated by the control device together with the vehicle system upon fulfillment of the authentication condition. In addition, the closure mechanism can also be closed upon closure of the motor vehicle. Such a closure mechanism can be, in particular, a cover, which can be opened or unlatched by an actuator. The actuation can occur in particular by radio.

The receiving device can additionally be connected to an alai u system of the motor vehicle, in order to make it usable for the storage of valuables, in particular. The valuables in this case can be dropped off as shipments in the motor vehicle, but the receiving device can also be used for the receiving of other valuables.

In particular, the receiving device can comprise a cooling device for cooling the interior of the receiving device. The cooling device of the receiving device can be supplied with energy by a battery of the motor vehicle. It is possible for the control device to control the power supply of the cooling device so that a cooling occurs only as long as sufficient energy is still stored in an energy storage for the starting of the motor vehicle. For example, the cooling can be interrupted when battery voltage drops below a predetermined limit value.

In particular, the cooling device can be activated only at a time when a message from the central device is received. In particular, this can involve a position request as to the current position of the motor vehicle. Alternatively, the cooling device can also be activated only upon fulfilling the authentication condition, the scheduled delivery time or another predetermined time.

Figure 2:
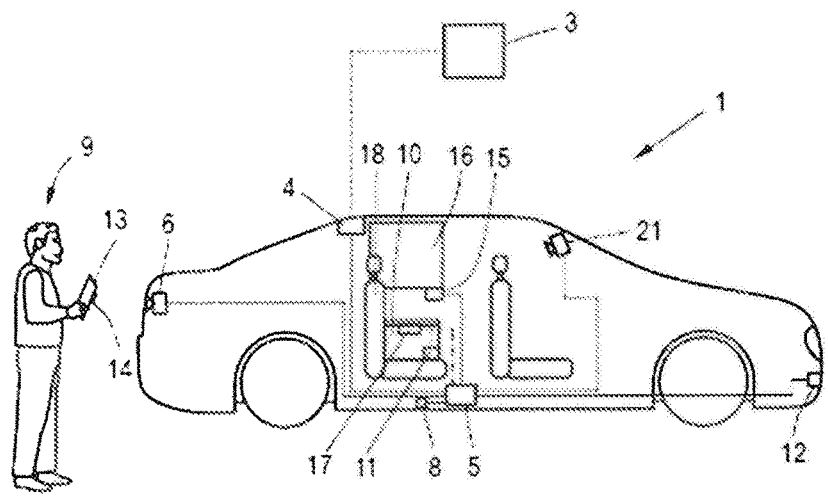
FIG. 2 illustrates a sample embodiment of a motor vehicle according to the invention.
Figure 3:
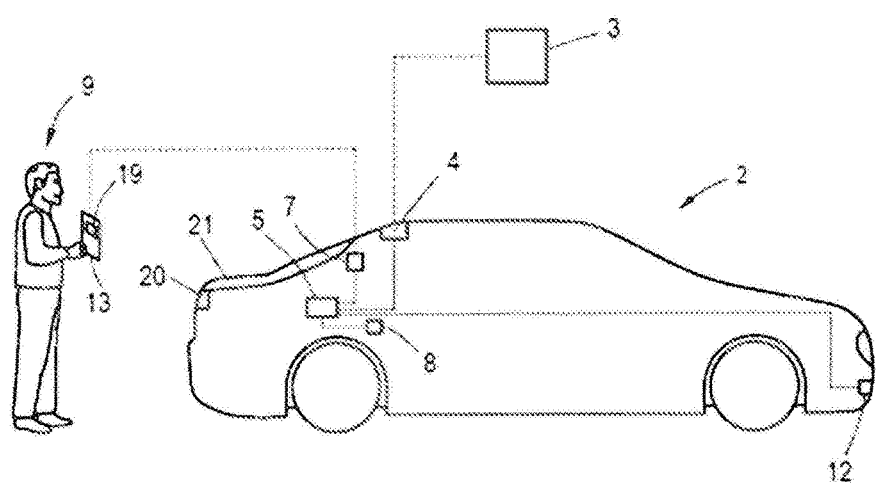
FIG. 3 illustrates another sample embodiment of a motor vehicle according to the invention.

Further benefits and details of the invention are shown by the following sample embodiments, as well as the accompanying drawings. There are shown:

FIG. 1 illustrates a flow chart of a sample embodiment of the method according to the invention;

FIG. 2 illustrates a sample embodiment of a motor vehicle according to the invention; and FIG. 3 illustrates another sample embodiment of a motor vehicle according to the invention.

FIG. 1 shows schematically a flow chart of a method for the drop-off of a shipment in a motor vehicle. The method shall be described below with reference to the representations shown in FIGS. 2 and 3 of motor vehicles used in the method. The motor vehicles 1, 2 represented in FIG. 2 and FIG. 3 differ in the manner of providing the access to at least a part of the interior of the motor vehicle and in the manner of detection of the authentication information.

FIG. 1 shows a flow chart of a method for drop-off of a shipment in a motor vehicle, which starts with the ordering of a shipment in an online shop in step S1 For this, the vehicle user or a third party authorized by the vehicle user communicates with a server of the online shop and indicates a distinct motor vehicle identification as the delivery address during the ordering, process.

In step S2, the delivery data for the order is transmitted to a delivery service. In the course of the transmission, the distinct motor vehicle identification detected in step S1 is likewise transmitted to the delivery service as the delivery address. The data transmission to the delivery service can occur in particular as a communication between a computer device associated with the online shop and a computer device associated with the delivery service.

In step S3, a computer device associated with the delivery service notices that a motor vehicle identification has been indicated as the address for a shipment to be delivered. Therefore, the computer device of the delivery service makes a request to a central device 3, which communicates with a plurality of motor vehicles 1, 2. Such a central device 3 can be operated, for example, by the respective maker of the motor vehicle. In such a request, there is an authentication of the computer of the delivery service by the central device 3, in order to make sure that the request comes from a legitimate delivery service.

If a legitimate request is in hand, i.e., a shipment to be dropped off is in hand, the central device 3 in step S4 generates a temporary digital key, which allows access to the motor vehicle 1 or 2 in a predetermined interval of time.

The key is transmitted in step S5 from the central device 3 to the communication device 4 of the motor vehicle 1 or 2 and stored there in the control device 5. In addition to the digital key, the time interval is transmitted during which the key will be valid. Alternatively, it would be possible to encode the time interval in the digital key itself, or the control device 5 itself could determine a corresponding time interval in dependence on the time of reception of the digital key.

Next, the central device 3 transmits an authentication information associated with the shipment to the computer device of the delivery service. The nature of the authentication information transmitted depends in particular on how an authentication is done with respect to the motor vehicle when dropping off the shipment. In the most simple case, the digital key itself is used as the authentication information and is detected by a reader 6, 7 of the motor vehicle 1, 2 as shall be explained more closely hereafter. In some cases, however, it can be advantageous to transmit to the computer device of the delivery service, as the authentication information, information associated with the digital key, such as a second key of a pair of keys for asymmetrical encryption.

In addition to the authentication information, in step S6 the central device 3 transmits presumptive whereabouts for the motor vehicle in the predetermined time interval to the computer device of the delivery service. In order to provide such presumptive whereabouts, the central device 3 stores for each motor vehicle 1, 2 taking part in the method a time-dependent profile of position data. The composition and the storage of the time-dependent profile of the position data is done in that, when a predetermined transmission condition is fulfilled, a position detection device 8 of the motor vehicle 1, 2 detects the position data of the motor vehicle and transmits it to the central device 3, after which the central device 3 stores a time-dependent profile of the position data. The transmission condition is fulfilled if the motor vehicle is standing still for a predetermined minimum time, namely 10 minutes, and a position transmission has not been switched off by a user of the motor vehicle.

Thanks to the repeated transmittal of position data at a plurality of times, positions are determined where the motor vehicle is frequently parked. By an evaluation of such transmitted position data regarding the time or day or the days on which it was transmitted, the central device 3 can make a prediction, depending on day and time, as to the presumptive location of the motor vehicle. Such a prediction is transmitted for at least one time within the predetermined time interval by the central device 3 to the computer device of the delivery service, and can be used in the route planning by the delivery service for the presumptive location of the motor vehicle. Alternatively, it would be possible for a vehicle user to amplify the time-dependent profile of the position data automatically determined as described with or to assign one or more times and locations at which a delivery to the motor vehicle is possible.

In step S7, the delivery service transfers the authentication information received from the central device 3 onto an authentication element. Depending on the readers 6, 7 provided in the motor vehicle 1, 2, different authentication elements can be used. If a shipment is to be dropped off in the motor vehicle 1, which comprises a camera as the reader 6, then the authentication element is an optical encoding of the authentication information placed on the shipment. In this case, the digital key, i.e., the authentication information, is placed on the shipment as a two-dimensional pattern with two tone values, namely, as QR Code®. If the shipment is to be dropped off in the motor vehicle 2, which comprises a RFID reader as the reader 7, an RFID chip will be placed on the shipment, in which the authentication information is stored, by affixing a label containing this chip to the shipment.

In step S8, the shipment is transported to the motor vehicle. For this, at first a route is planned, based on the assumption that the motor vehicle will be at the probable position as transmitted by the central device 3 at the time when it is presumably reached. At a predetermined time before reaching this position, the delivery agent 9 by a communication device, namely a smartphone, will send a request to the central device 3 regarding the current position of the motor vehicle. Upon arrival of this request, the central device 3 polls the current position of the motor vehicle 1, 2 via the communication device 4 of the motor vehicle 1, 2, which is detected by the position sensor 8 and provided via the control device 5. If at the time of the request no current position can be detected by the position detection device 8, for example because no navigation signals are being received from satellites, the control device 5 can predict a current position in dependence on values of other not indicated sensors, such as acceleration sensors, from a previously detected position. Alternatively, the control device 5 can transmit by the communication device 4 in this case the last known position of the motor vehicle 1, 2 to the central device 3. The central device 3 can in some cases amplify the position information transmitted from the motor vehicle 1, 2 from a vehicle profile stored in the central device 3. For example, it can be recognized that a last known position is coordinated with the entrance to a parking structure and a predetermined parking place within this parking structure can be stored in the motor vehicle profile.

In step S9, a check is made to see whether a current position has been provided by the central device. If this is not so, then in step S10 the delivery process is broken off or an alternative delivery option is used for the delivery, i.e., a delivery to the home address of the vehicle user, for example. To determine an alternative delivery option, the central device 3 can transmit selected alternative delivery options in accordance with a motor vehicle profile stored in the central device 3. If no such alternative delivery option has been provided, the method ends with a breaking off of the delivery attempt.

But if it was determined in step S9 that a current position of the motor vehicle can be determined, then in step S1 the transport of the shipment to the motor vehicle continues in step S11, until the shipment is present in the area of the motor vehicle. If perishable goods are being delivered and the motor vehicle 1 comprises a separately closable receiving device 10 with a cooling device 11, the central device 3 can furthermore send an instruction via the communication device 4 to the control device 5 to activate the cooling device 11. The cooling device 11 is then powered from the onboard network of the motor vehicle 1. The communication with the control device 5 occurs by radio.

When the motor vehicle is located on large parking surfaces, where in particular the reception of satellite navigation signals is disrupted, such as underground garages, the delivery may be very time-consuming, even when the delivery agent 9 knows the identifier of the motor vehicle and/or its color and type, since he first has to search for the motor vehicle. In such situations, the delivery agent 9 sends a request, via a communication device in step S12, to transmit an indicator request to the control device 5. Upon receiving such an indicator request via the communication device 4 of the motor vehicle 1, 2, the control device 5 controls a delivery indicator device 12, namely a blinker of the motor vehicle, to give an indication to the delivery agent. The delivery agent can thus easily identify the motor vehicle 1, 2 and approach the motor vehicle 1, 2.

In step S13 the authentication information associated with the shipment or information derived from this is detected by the reader 6, 7 of the motor vehicle 1, 2 and in step S14 a check is made to see whether an authentication condition, which evaluates the authentication information or the information derived from it and the digital key, is fulfilled. This process as well as the opening of the motor vehicle 1, 2 is clearly different for the motor vehicle 1 from the process for the motor vehicle 2. Therefore, these two processes shall be explained separately below for the motor vehicles 1, 2.

In motor vehicle 1, which is shown in FIG. 2, the reader 6 is a camera. The authentication information corresponds to the digital key and is placed in the form of an optical code 14, namely a QR Code®, on the shipment 13. In order to gain access to the inside of the motor vehicle 1, the delivery agent 9 holds the shipment 13 in front of the reader 6 so that the optical code 14 is optically detected by the reader 6. The images of the camera, i.e., of the reader 6, are processed by the control device 5 and it is recognized when a corresponding optical code 14 lies in the image region. If an optical code 14 is recognized in the image region, this is detected as authentication information, which corresponds to the digital key and with which the digital key stored in the control device 5 is compared.

In step S14, a check is made to see whether the stored digital key agrees with the detected authentication information. If this is not the case, the method ends with step S15 and the motor vehicle is not opened. This is possible, for example, when the authentication element has been damaged in the course of the transport of the shipment or if the digital key was not transmitted correctly. In this case, the delivery of the shipment must either be broken off or, as explained in step S10, an alternative delivery option must be used, such as a delivery to the residential address of the vehicle user.

However, if the authentication information and the stored digital key match, then in step S16 the vehicle device 15, namely a window opener associated with the window 16, is actuated, so that the window 16 is opened. The delivery agent 9 is granted access to a part of the motor vehicle interior. The drop-off of the shipment should take place in the motor vehicle 1 in the separately closable receiving device 10 secured to the rear seat 18 with an Isofix fastening. The receiving device 10 comprises a closure mechanism 17, which closes the receiving device 10. This is actuated by the control device 5 by a radio signal at the same time as the window opener, in order to open the separately closable receiving device 10, The delivery agent 9 can then place the shipment 13 through the window 16 into the separately closable receiving device 10.

In the motor vehicle 2 shown in FIG. 3, the sequence of the above explained steps is somewhat different, since a RFID chip is used as the authentication element 19 of the shipment 13, so that the authentication at the motor vehicle 2 occurs differently. Furthermore, a drop-off of the shipment 13 in the trunk of the motor vehicle 2 is called for. The reader 7 of the motor vehicle 2 and the authentication element 19, i.e., the RFID chip, use a cryptographic security method. Many such methods are known in the prior art, for example, a symmetrical key pair can be used as authentication information and digital key. In the motor vehicle 2, a relatively simple method is used in which the authentication information is equal to the digital key. In step S13, the control device 5 upon detecting an authentication element 19 in the receiving region of the reader 7 provides random digital data, which is transmitted from the reader 7 to the RFID chip. The RFID chip encrypts the random data with the authentication information and a hash value is formed from the encrypted data. This hash value is then sent by the RFID chip back to the reader 7 and detected by the latter as information derived from the authentication information.

In step S14 it is then checked to see whether the authentication condition is fulfilled. For this, the random data is encrypted by the control device with the digital key stored in the control device and a hash value is likewise formed. If the hash value derived in step S13 as the information derived from the authentication information matches up with the hash value calculated by the control device 5 itself, the authentication condition is fulfilled and the method continues with step S16 and thus the enabling of access to a part of the motor vehicle interior. If the authentication condition is not fulfilled, i.e., the hash values do not match, the method is broken off with step S15, as already explained.

If it is determined in step S14 that the authentication condition is fulfilled, then in step S16 the vehicle device 20, a trunk lock of the motor vehicle 2, is actuated by the control device 5. In this way, the delivery agent 9 can open the trunk hatch 21 of the motor vehicle 2 and drop off the shipment 13 in the trunk space of the motor vehicle 2.

In both cases discussed, in step S17 a check is made to see whether the shipment has already been dropped off in the motor vehicle or whether a given waiting time has expired. During this time, the camera 21 in the motor vehicle 1 detects the part of the motor vehicle interior of the motor vehicle 1 that was made accessible and a film of this period of time is stored in the control device 5 to make it possible for the vehicle user to track the drop-off process of the shipment 13. Furthermore, it is recognized by the camera 21 and an image processing in the control device 5 whether the shipment 13 was already placed in the receiving device 10. If a drop-off of the shipment 13 in the receiving device 10 is recognized, and furthermore that all the limbs of the delivery agent 9 have left the motor vehicle interior, the motor vehicle is closed. In both the motor vehicle 1 and the motor vehicle 2, the motor vehicle is closed when the given waiting time has expired. Step S17 is repeated as long as these two conditions are not fulfilled. Once they are fulfilled, the motor vehicle is closed in step S18.

For this, the window opener is actuated in motor vehicle 1 by the control device 5 in order to close the window 16. Furthermore, the closure mechanism 17 of the receiving device 10 is actuated in order to close the cover of the receiving device. In motor vehicle 2, the trunk lock 20 is latched. Furthermore, by an actuator not shown the hatch 21 of the trunk space is closed. After the closure of the motor vehicle, the communication device 4 sends a message to the central device 3 on the one hand to confirm the drop-off of the shipment in the motor vehicle, and on the other hand to trigger a notification of the vehicle user by an email or a SMS.

What is claimed is:

1. A method for dropping off of a shipment in a motor vehicle, comprising:
    generating, by a central device, a temporary digital key, which allows access to the motor vehicle once or repeatedly during a given interval of time;
    transmitting the temporary digital key via a communication device of the motor vehicle to a control device of the motor vehicle and storing the temporary digital key in the control device;
    detecting, after the shipment has been transported to the motor vehicle, a piece of authentication information transferred onto an authentication element associated with the shipment using a reader of the motor vehicle, wherein the piece of authentication information corresponds to the temporary digital key or to a piece of information associated with the temporary digital key;
    actuating a vehicle device to enable access to at least part of an interior of the motor vehicle by, the control device upon fulfillment of an authentication condition evaluating both the piece of authentication information and the temporary digital key; and
    actuating the vehicle device and/or another vehicle device to close the motor vehicle after placement of the shipment in the motor vehicle or after a predetermined waiting period,
    wherein the motor vehicle comprises a position detecting device for detecting position data of the motor vehicle repeatedly or upon fulfillment of a predetermined transmittal condition, and
    wherein the central device stores a time-dependent profile of the position data, determines a probable position of the motor vehicle at a time of delivery of the shipment based on the time-dependent profile, and provides the probable position to a deliverer of the shipment.

2. The method of claim 1, wherein the authentication element is an optical encoding placed on the shipment, wherein the piece of authentication information is optically detected by the reader.

3. The method of claim 2, wherein the temporary digital key is placed onto the shipment as a one-dimensional or two-dimensional pattern with two tone values.

4. The method of claim 1, wherein the authentication element is a transponder device associated with the shipment, and wherein the piece of authentication information is detected by the reader in a communication with the transponder device.

5. The method of claim 4, wherein the transponder device is a radio frequency identification (RFID) chip or a near field communication (NFC) chip.

6. The method according to claim 1, wherein the authentication element is an electric device that stores several pieces of authentication information coordinated with different shipments.

7. The method of claim 1, further comprising:
polling the position detecting device, prior to or during transport of the shipment to the motor vehicle, for current position data of the motor vehicle using the central device; and
transmitting the current position data to another communication device.

8. The method of claim 1, further comprising:
transmitting a request, by the central device via the communication device, to the control device for a sign to a delivery agent; and
in response to receiving the request for the sign, actuating a delivery indicator device to give the sign to the delivery agent.

9. The method of claim 1, wherein upon fulfillment of a usage condition, which indicates an intention of a driver of the motor vehicle to move the motor vehicle within a given further interval of time, and/or after a message from the central device, a driver indicator device is actuated by the control device to give a sign to the driver of the motor vehicle.

10. The method of claim 1, wherein the access to the at least part of the interior of the motor vehicle is enabled by opening a window or unlatching a lock of the motor vehicle.

11. The method of claim 1, further comprising:
detecting, using a camera of the motor vehicle, the at least part of the interior of the motor vehicle that access is enabled to; and
saving snapshots of the camera, using the control device, during the time in which the access to the at least part of the interior of the motor vehicle is enabled.

12. A motor vehicle, comprising:
a reader;
a communication device;
a control device configured to:
store a digital key received from a central device via the communication device,
detect, using the reader, authentication information associated with a shipment or information derived from the authentication information,
actuate a vehicle device to enable access to at least one part of an interior of the motor vehicle upon fulfillment of an authentication condition evaluating both the authentication information or the information derived from the authentication information and the digital key, and
actuate the vehicle device and/or another vehicle device to close the motor vehicle after drop-off of the shipment in the motor vehicle or after a predetermined waiting time; and
a position detecting device for detecting position data of the motor vehicle repeatedly or upon fulfillment of a predetermined transmittal condition,
wherein the central device stores a time-dependent profile of the position data, determines a probable position of the motor vehicle at a time of delivery of the shipment based on the time-dependent profile, and provides the probable position to a deliverer of the shipment.

13. The motor vehicle of claim 12, further comprising:
a separately closable receiving device configured to receive the shipment, wherein the separately closable receiving device is accessible to the delivery agent upon fulfillment of the authentication condition.

14. The motor vehicle of claim 13, wherein the separately closable receiving device comprises a closure mechanism that is controllable by the control device and is actuated by the control device upon fulfillment of the authentication condition.

15. The motor vehicle of claim 13, wherein the separately closable receiving device comprises a cooling device configured to cool an interior of the receiving device.

* * * * *